United States Patent [19]

Hamling

[11] 3,861,947

[45] Jan. 21, 1975

[54] PROCESS FOR THE PREPARATION OF ZIRCON COATED ZIRCONIA FIBERS

[75] Inventor: Bernard H. Hamling, Warwick, N.Y.

[73] Assignee: Union Carbide Corporation, New York, N.Y.

[22] Filed: Oct. 2, 1972

[21] Appl. No.: 293,768

[52] U.S. Cl. .................. 117/118, 106/57, 117/128, 117/135.1, 117/138, 117/169 R
[51] Int. Cl. ...................... B32b 15/02, B44d 5/12
[58] Field of Search ........ 117/118, 135.1, 169, 128, 117/138; 106/57

[56] References Cited
UNITED STATES PATENTS

| | | | |
|---|---|---|---|
| 2,852,409 | 9/1958 | Roe | 117/135.1 |
| 2,854,353 | 9/1958 | Schwope | 117/135.1 |
| 3,259,558 | 7/1966 | Hagiwara et al. | 117/118 |
| 3,311,481 | 3/1967 | Sterry et al. | 106/57 |
| 3,385,915 | 5/1968 | Hamling | 106/59 |
| 3,416,953 | 12/1968 | Gutzeit et al. | 117/138 |
| 3,709,706 | 1/1973 | Sowman | 106/57 |

*Primary Examiner*—William D. Martin
*Assistant Examiner*—Sadie L. Childs
*Attorney, Agent, or Firm*—William Raymond Moran

[57] ABSTRACT

Zirconia fibers and structures made therefrom having improved high temperature properties are provided by applying a thin film of amorphous silica on the surfaces of the fibers and reacting the two components by thermal treatment to form the zircon phase. The fibrous zirconia structures have improved resistance to shrinkage, sagging and thermal shock at temperatures up to 3000°F and are ideally suited as light weight, thermal insulation.

8 Claims, No Drawings

PROCESS FOR THE PREPARATION OF ZIRCON COATED ZIRCONIA FIBERS

This invention relates in general to zircon-coated zirconia fibers and structures prepared therefrom. In one aspect this invention relates to zirconia fibers having improved high temperature properties. In a further aspect this invention is directed to light weight thermal insulation which has improved dimensional stability.

Refractory oxide fibers are known to make effective thermal insulation systems due to their inertness in air, low thermal conductivity, low volume heat capacity and resistance to damage by thermal shock. Fibrous thermal insulations, such as blankets, woven fabrics, needled felt, water-and-air-laid non-woven blankets, and inorganically-bonded boards and panels have been limited in their use at high temperatures due to shrinkage and lack of dimensional stability caused by exposure to high temperatures.

Many furnace applications require thermal insulation to undergo no more than 2–3% linear shrinkage during use. Greater shrinkage causes cracks to open up resulting in increased heat losses. The insulation structure must also not slump or settle out of its installed configuration for greatest utility. These criteria have been met heretofore by the construction of furnaces using thick heavy fire bricks having high thermal conductivities. Such furnaces are characterized by their massiveness, slow heating and cooling cycles and large energy consumptions.

Most commercial refractory oxide fibers, are limited for use as thermal insulation to 2300°F due to shrinkage and loss of dimensional stability. Modified aluminosilicate fibers are limited likewise to temperatures of 2700°F and lower.

Zirconia fibers are exceptionally effective as thermal insulation at temperatures as high as 4000°F. Zirconia has the lowest thermal conductivity of the commercial refractory oxides and is stable in many environments up to its melting point near 4800°F.

Zirconia fibers produced according to the process disclosed in U.S. Pat. No. 3,385,915 are composed of sub-micron crystallites. When subjected to temperatures above 2200°–2500°F, the crystallites grow in size. Prolonged heating of the fibers at 2800°–3000°F causes the crystallites to grow to 1–5 microns in size. This growth is normally accompanied by an increase in the cross sectional area of the fiber and shortening of its length, resulting in an overall shrinkage of a body of fibers. Linear shrinkages in a body of zirconia fibers of 6 and 8% are frequently encountered after prolonged heating at 2800° and 3000°F, respectively.

The preparation of fibers composed of zircon and mixtures of zircon and zirconia are known in the literature. See for example, U.S. Pat. No. 3,311,481. These compositions could be expected to be more or less homogeneous throughout the fiber, rather than a coated structure, since colloidal silica is added to the zirconia salt solution prior to forming the fiber. Zirconia/silica refractory fibers, described in Dutch Pat. No. 7,006,646 are also homogeneously mixed. Formation of zircon in these fibers is noted when heat treated at 1204°C. U.S. Pat. No. 3,416,953 describes a method of improving zirconia, zircon, and silica fibers by coating and reacting the surface layer of the fibers with chromic acid and phosphoric acid. The treated fibers have improved wettability and bonding characteristics with plastic resins.

It is therefore an object of this invention to provide zirconia fibers and structures having improved high temperature properties. Another object of this invention is to provide fibrous zirconia bodies which have improved resistance to shrinkage, sagging and thermal shock at temperatures of about 3000°F. A further object of this invention is to provide zirconia fibers and structures which have a zircon coating formed by applying a thin film of amorphous silica on the fiber surface followed by thermal treatment. Another object of this invention is to provide a process for the preparation of the zircon-coated zirconia fibers. These and other objects will readily become apparent to those skilled in the art in the light of the teachings herein set forth.

In its broad aspect this invention relates to the preparation of zircon-coated zirconia fibers and various structures or bodies prepared therefrom. The fibers are prepared by a process which comprises the steps of:

a. contacting zirconia fibers with a silicon containing compound to form a coating on the fibers, and b. heating the coated fibers to a temperature and for a period of time to form a zircon phase on the fibers by interaction of the silicon-containing compound and the zirconia.

The fibers prepared by the process of this invention have improved high temperature properties which render them ideally suited as light weight thermal insulation. The fibers are characterized by improved resistance to shrinkage, sagging and thermal shock up to temperatures primarily above 2500°F and particularly 2800°–3100°F.

In general, a variety of zirconia fibers can be employed in the instant invention. These fibers prepared by the process disclosed in the aforementioned U.S. Pat. No. 3,385,915 are particularly useful. The fibers may be unstabilized, partially-stabilized or fully-stabilized zirconia. Fully stabilized fibers require longer heat treatments at higher temperatures to effect the reaction. The zirconia fibers to be treated may be in any textile form including staple fibers, yarn, woven cloth, braids, batting, paper, or needled felt.

In practice, the silica which is applied to the fibrous zirconia can be employed in a variety of forms. For example the coating can be applied as ethyl orthosilicate. This compound is soluble in alcohol and can be used to coat the fibers. After removal of the solvent by drying the organic portion of the compound volatilized by heating at 300°–1200°F, alternately, the compound can be hydrolyzed with water leaving a silica coating on the surface of the fiber.

Silicon tetrachloride can also be employed. This compound reacts with moisture to produce a silica solid and gaseous HCl. When contacted with moist fibers, silica is deposited on their surfaces. $SiCl_4$ has a high vapor pressure and may be passed through a fiber bed or structure in the vapor form. The amount of silica to be deposited is proportional to the moisture content of the fibers. Alternately, the compound may be used in its normal liquid form. However, it is preferable to dilute it to 2–10% concentration with an inert solvent, such as benzene.

Other silicon-containing compounds such as silicone resins, silicon metal, alkali silicates and organo-silanes can be employed in coating the fibers. The organosilanes upon contact with moist fibers, react with water, condense and form a silicone polymer on the surfaces of the fiber. After removal of reaction products, HCl or alcohol, the polymer is decomposed to form silica by heating in air at 800°–1000°F.

Illustrative organo-silanes include among others; methyltrichlorosilane, methylvinyldichlorosilane, methyltriethoxysilane, vinyltrichlorosilane, vinyl silane, ethyltriethoxysilane, amyltriethoxysilane, phenyltrichlorosilane, trichlorosilane, amino silane.

In practice, the silica can be applied to the surface of the fibers in a variety of ways. For example, if a colloidal dispersion is used the fibers can be coated by contacting them with the dispersions for a few seconds or more. Excess silica is then removed from the fibers by one of several methods such as centrifugation, pressure rolling, blotting, or vacuum filtration depending on the particular form. The fibers are then dried at 230°–300°F.

It is also possible to deposit silicon metal on the surfaces of the fiber by conventional chemical vapor deposition techniques. Following deposition silicon metal is oxidized to silica 1200°–2000°F.

Sodium and potassium silicates can be deposited on surfaces of the fiber by wetting the fibers with a 1–10% water solution of the silicates. The Na and K ions are next removed from the coating by washing the fibers in dilute acid such as HCl or $H_2SO_4$, leaving an alkali-free silica coating.

Other method for depositing silica on surfaces of inorganic materials using organosilanes are described in Bulletin No. SF-1239A, 7/64, entitled "Treatment of Inorganic Fillers with Union Carbide Silicones" Silicones Division, Union Carbide Corporation, 270 Park Avenue, New York, N.Y.

The amount of silica deposited on the zirconia fibers is not necessarily critical. It has been observed that improved high temperature properties can be obtained when the fibers are coated with from about 5 to about 35 weight percent $SiO_2$, and more preferably from about 15 to about 25 weight percent $SiO_2$.

A critical feature of the invention is the thermal treatment to impart the improved properties. The improved characteristics are attributed to the formation of a zircon phase by reaction of the silica with the zirconia surfaces. Zircon phase forms on unstabilized fibers (i.e., zirconia fibers, not doped with a stabilizing agent such as $Y_2O_3$) by heat treatment at 2000°–2500°F for 3 or more hours to form sufficient zircon for imparting high temperature stability. Fibers fully stabilized in the cubic or tetragonal forms, such as those sold by Union Carbide Corporation under the trade mark ZIRCAR fibers must be heated at 2300°–2500°F for 3 or more hours to form sufficient zircon for imparting high temperature stability. Preferably heat treatment at 2400°F for 16 hrs is used for stabilized fibers. While as little as a few percent of zircon formation imparts improved stability, 20–50% is preferred for best properties.

As previously indicated the zircon-coated fibers of this invention can be employed for a variety of uses. Objects made of zircon-coated zirconia fibers are dimensionally stable to within 50°–100°F of the dissociation temperature of zircon (i.e., stable up to 3050°–3100°F). Zircon-coated zirconia fiber objects have lower thermal expansions than those containing no zircon. They also are stronger and have greater resistance to damage by thermal shock. The fibers are particularly attractive for use as light weight thermal insulation. The fibers and structures made from them are particularly useful in furnace application including thermal insulation at temperatures of 3100°F with essentially no dimensional change. The fibers can be fabricated into a variety of different forms. As indicated in the examples rigid insulating boards can be prepared by depositing fibers in a silica solution on a paper sheet mold to form a cake followed by drying and thermal treatment. When a rigid body is desired, such as a thermal insulation panel, the body is held fixed (without movement) during drying of the coated solution of colloidal silica. In so doing, the fibers become bonded together at points of contact. The body or board can thereafter be cut to any desired size for use as insulation panels or other uses. The structures can also be employed as catalysts supports and can be fabricated into a variety of forms either alone or with high surface area components such as alumina.

The following examples are illustrative:

EXAMPLE 1

In this example, yttria-stabilized zirconia staple fibers having the following composition by weight: 88.2% $ZrO_2$; 7.3% $Y_2O_3$; 2.5% rare earth oxides; 0.04% $Fe_2O_3$ were employed. X-ray diffraction analysis showed the fibers to be completely composed of the cubic crystallographic form.

A rigid board was formed by blending 351 gm of one-eighth to one-fourth inch long fibers into 30 liters aqueous solution containing 16.0 wt % Ludox HS (Sp. Gr. = 1.094 at 75°F) and at a pH of 5.0. The fibers were deposited on an 80 mesh screen in a 12 inch Williams paper sheet mold while drawing the solution through the screen using 25 inch Hg vacuum. Vacuum was continued for 5 minutes to pull off excess solution. The wet fiber cake was next pressed to diminish its thickness from 1⅛ inches to ⅝ inch. It was then placed on a flat plate, sealed in a plastic bag and heated at 90°C for 16 hours, causing the colloidal silica to gel. The plastic bag was removed and the rigidized board dried in 8 hrs at 100°C. The board so formed measured 11½ inches × 11-7/16 inches × 0.525 inch thick, had a green density of 25.5 lb per cu ft and contained 25.6% $SiO_2$.

1 inch × 3 inch specimens were cut from the green board, accurately measured, and heat treated for a variety of times and temperatures as indicated in the table below. In all cases the specimens were heated to the indicated temperature within a period of 15 minutes and following the hold time were cooled to near room temperature within 15 minutes. Following the indicated heat treatment, specimens were remeasured and heated isothermally at 3000°F for 1 hr. Heat up and cool down times were controlled at 15 minutes. The table below lists the shrinkages after these treatments.

X-ray diffraction analysis indicated that zircon formed in specimens heated between 2350°F and 2650°F and that only small amounts of the zircon phase is necessary for improved stability at 3000°F. It is noted that the specimen not heat treated in this temperature region prior to subjecting it to 3000°F, shrank very much, even more than fibers not treated with silica. Thus, it was observed that treatment of zirconia fibers with silica is detrimental to their high temperature stability, i.e., causes increased shrinkage, unless combined with a specific heat treatment prior to use at temperatures above about 2700°F.

In table I below, the influence of heat treatment on the zirconia fibers is set forth:

Table I

FORMATION OF ZIRCON AND 3000°F-STABILITY
OF SILICA-TREATED ZIRCONIA FIBERS
AS INFLUENCED BY HEAT TREATMENT

| Heat Treatment Time at Temperature | Zircon Content, I 27.1°* | Cubic ZrO$_2$ Content, I 30.2°* | Shrinkage After One Hr. at 3000°F | |
|---|---|---|---|---|
| | | | Linear,% | Volume,% |
| None (dried at 200°F only) | 0 | 89 | 20.8 | 67.6 |
| 20 hr; 2000°F | — | — | 13.7 | 47.1 |
| 14.5 hr; 2200°F | — | — | 7.3 | 37.6 |
| 1.0 hr; 2350°F | 35 | 95 | 0.0 | 0.1 |
| 0.5 hr; 2475°F | 2 | 74 | 2.0 | 9.7 |
| 1.0 hr; 2475°F | 5 | 76 | 1.2 | 5.3 |
| 15.2 hr; 2465°F | 30 | 95 | 0.0 | 0.0 |
| 41.0 hr; 2475°F | 45 | 95 | 0.5 | 1.7 |
| 1.0 hr; 2650°F | — | — | 8.9 | 41.5 |
| 2.0 hr; 2650°F | — | — | 11.1 | 45.1 |
| 35.0 hr; 2650°F | 60 | 90 | 0.3 | 1.2 |

*Relative intensity of the X-ray defraction lines at 27.1° and 30.2° respectively (2 theta degrees) using copper-alpha X-rays.

EXAMPLE 2

A rigid, bonded fiber board was formed by mixing 451 gm of one-eighth inch to one-fourth inch long zirconia fibers (fully stabilized in the cubic form with yttria) with 10 l. of water containing 28 wt % "Ludox" HS and which had been adjusted to pH 7.6 by addition of HCl. The fibers were deposited on a 60 mesh screen by pulling the solution through it using 25 inch Hg vacuum. The wet fiber cake measured 12½ inches × 12½ inches × 9/16 inch thick and weighed 1150 gm. It was placed on a flat sheet, sealed in a polyethylene bag, and held at 93°C for 15 hrs. The semi-rigid fiber board, containing 25.0% gelled silica, was next removed from the plastic bag and dried at 110°C.

The rigid board weighing 617 gm, was placed on a flat refractory setter and fired in a silicon carbide electrically-heated kiln from near room temperature to 2500°F in 8 hours. After 20 hrs soak at 2500°F, the kiln was cooled to 200°F. The fired board measured 12⅛ inches × 12-3/16 inches × 0.494 inch thick, had a bulk density of 31.4 lb per cu ft.

Thermal conductivity values were obtained on this board over the temperature range 40° to 1100°C by the guarded hot plate method according to ASTM C177-71. Thermal conductivity values are tabulated below on Table II.

Table II

| Mean Temperature °C | Thermal Conductivity | |
|---|---|---|
| | W m$^{-1}$ K$^{-1}$ | Btu in hr$^{-1}$ ft$^2$ F$^{-1}$ |
| 40 | 0.12 | 0.83 |
| 200 | 0.134 | 0.92 |
| 425 | 0.155 | 1.07 |
| 500 | 0.162 | 1.12 |
| 600 | 0.175 | 1.21 |
| 875 | 0.21 | 1.46 |
| 1100 | 0.25 | 1.73 |

EXAMPLE 3

This example illustrates the superior dimensional stability of zircon-containing zirconia fiber board at 3000°F compared to zirconia fiber board containing no additions.

A fiber board was prepared by mixing 1 lb of one-fourth inch long yttria-stabilized zirconia fibers in 14 liters of Ludox HS colloidal silica which had been adjusted to 21 wt % SiO$_2$ and pH of 7.0 by addition of water and AlCl$_3$ salt, respectively. The board was formed by adding the fiber slurry to a 12 inch William paper sheet mold and depositing the fiber mass on top of the 80 mesh screen while drawing the solution through it with slight vacuum. The wet board so formed was supported on a flat perforated metal plate while partially drying overnight at room conditions, then further drying in an oven at 100°C for 3 hours. The dried rigidized board measured 11.4 inches × 11.5 inches × 0.71 inch, had a bulk density of 23.5 lb per cu ft and contained 24% SiO$_2$.

A "self-bonded" zirconia fiber board was prepared by airing ten layers of batting in a two step process. The batting was a loosely interlocked yttria-stabilized zirconia fiber mat made by the rayon precursor method in the following manner. Salt-loaded 3.0 denier, 3 inch long crimped rayon staple was formed into a 5 inch thick batt on a Rando-Webber Curolator and then compressed to 2 inches thick by passing it through a needle punch loom which interlocked the batt for increased mechanical strength. The batt was next converted to the oxide form by pyrolyzing it in a manner described in copending application U.S. Ser. No. 799,988, filed Feb. 17, 1969, and now abandoned, by A. W. Naumann et al., entitled "Method for the Reduction of the Carbon Content From Mixtures of Carbon and Metal Compounds" and assigned to the same assignee as this invention. Ten layers of zirconia batting, each measuring 21 inches × 26 inches, weighing 5.66 lb total were stacked to a height of 7.5 inches on a flat three-eighths inch thick fused silica plate. A second silica plate was placed on top of the batting and 246 lb of firebricks placed uniformly on the plate. This was then loaded into a kiln and heated for 5 hrs at 2000°F. The batting compressed to 1⅝ inches under the load and heat and was formed into semi-rigid board, of 9.7 lb per cu ft density.

Both the silica-containing board and the compressed batting were then placed on high alumina setters and fired in a gas-fired kiln as follows:

Heat at a linear rate of 200°F/hr from 100° to 2800°F,

Hold 3 hrs at 2800°F,
Cool at a linear rate of 200°F/hr from 2800°F to 200°F.

The board treated with silica shrank 1.5% on the sides and 5.6% in thickness and increased in density to 25.6 pcf. The board so formed from batting shrank 8.0% on the sides and the thickness 67% and increased in density to 35 lb per cu ft.

4 inches × 1 inch sections were cut from both boards and heated isothermally at 3000°F in a small laboratory furnace heated by Kanthal Super 33 elements. Shrinkage was measured on the long dimension at specified times and are set forth below in Table III:

Table III

| Time at 3000°F | Silica-Treated Board | Self-Bonded Board |
|---|---|---|
| 1 hr | 0.0% | 0.7% |
| 5 | 0.2 | 2.1 |
| 10 | 0.6 | 4.0 |
| 20 | 1.4 | 5.6 |
| 30 | 2.0 | 6.8 |

The above shrinkage data illustrates that zirconia fibers treated with amorphous silica and heat treated in the specified manner produces a board substantially more dimensionally stable at 3000°F.

EXAMPLE 4

This example illustrates the use of zirconcoated zirconia fiber board as an efficient and stable thermal insulation for a rapid cycling air furnace operating up to 3000°F. The furnace used is the model illustrated in the article "High Temperature Furnace: 3000°F in 5 Minutes", B. P. Macdonald, et al., *Ceramic Age*, pages 24–25, September, 1971. The furnace was insulated on all six sides with one-half inch thickness of bonded fiber board prepared according to Example 1. The board was backed (on the cold wall side) with one-fourth inch thickness of 8 lb per cu ft Babcock and Wilcox Kaowool Blanket.

The furnace was heated from room temperature to 3000°F. Temperatures measured in the center of the furnace with a Leeds and Northup potientimeter using a Pt vs Pt 10% Rh thermocouple are listed below as the voltage was applied across the six Kanthal Super 33 heating elements wired in series:

| Time, Minutes | Voltage Applied | Temperature Measured °F |
|---|---|---|
| 0 | 20 | 80 |
| 6 | 30 | 1200 |
| 9 | 40 | 1800 |

-Continued

| Time, Minutes | Voltage Applied | Temperature Measured °F |
|---|---|---|
| 12 | 50 | 2450 |
| 17 | 50 | 3000 |
| 25 | 43 | 3000 |

43 volts were required to maintain the furnace at 3000°F. After 60 min hold period at 3000°F the exterior metal wall temperature was measured at 750°F. Upon shutting off the applied voltage the inside of the furnace dropped in temperature to 600°F in less than 10 minutes.

No observable change in the insulation resulted from this heating cycle. During the next two months the furnace was subjected to 28 similar thermal cycles, with hold times at 3000°F ranging from 30 minutes up to 36 hours. The total time at 3000°F was 113 hours. During this period no shrinkage, warping or damage occurred to the zirconia fiber board. Also, the thermal insulation effectiveness remained unimpaired.

EXAMPLE 5

A low density rigid board was prepared using unstabilized zirconia fiber (i.e., no phase stabilizing oxide had been incorporated in the fibers). The fibers were substantially all monoclinic phase and were composed of > 99% $ZrO_2$. A method known in the trade as "starch exhaustion" was used to deposit the colloidal silica on the fibers. 200 gm of one-eighth inch long fibers were suspended in 10 liters of water by hand mixing with a spatula. 167 gm of Ludox HS40 solution (containing 67 gm $SiO_2$) was added to the fiber suspension, followed by the addition of 3.4 liters of a 1% solution of cationic starch while continuing hand stirring for one minute. (Starch was Q-TAC™ brand Cationic Starch No. 3894, sold by Industrial Division, Corn Products Sales Co., New York, N.Y. Starch solution was prepared by dispersing the dry product in cold water at a 2.0% solids level, then cooking the slurry for 20 minutes at a temperature of 195°–200°F. It was then diluted to a total solids of 1.0% before using.) The fiber board was formed in a board mold in a similar manner. After removing from the mold, the board was compressed in thickness from five-eighths inch to one-half inch and dried at 90°C on a flat plate. The dried rigid board was next held in air at 600°C for 4 hours to oxidize the contained starch. The board so treated contained 10.71% $SiO_2$, as determined by chemical analysis, and 89% zirconia by difference, and had a bulk density of 26.3 lb per cu ft.

The board was cut into a number of 1 inch × 3 inch specimens which were accurately measured and heat treated as listed in Table IV. The specimens were next measured and subjected to an isothermal soak at 3000°F for a period of 1 hour.

Table IV

DIMENSIONAL STABILITY OF SILICA-TREATED
UNSTABILIZED ZIRCONIA FIBERS
FOLLOWING VARIOUS HEAT TREATMENTS

| Heat Treatment Time at Temperature | Shrinkage After Heat Treatment | | Shrinkage(*)After One Hr at 3000°F | |
|---|---|---|---|---|
| | Linear,% | Volume,% | Linear,% | Volume,% |
| None (Baked at 1100°F only) | — | — | 5.2 | 30.1 |
| 3 hr, 2000°F | 2.4 | 11.9 | −0.5 | 5.5 |
| 1 hr, 2200°F | 2.4 | 9.3 | −1.5 | 1.3 |
| 1 hr, 2300°F | 2.2 | 12.9 | −1.1 | −1.0 |
| 1 hr, 2350°F | 2.0 | 11.2 | −0.9 | −2.2 |
| 1 hr, 2450°F | 2.4 | 12.4 | −0.8 | −1.7 |
| 3 hr, 2500°F | 1.5 | 12.4 | −0.6 | −1.1 |

*Negative shrinkage value indicates increase in dimensions.

What is claimed is:

1. A process for the preparation of zircon-coated zirconia fibers and fibrous bodies having high temperature stability which comprises the steps of:
   a. contacting zirconia fibers with a silicon-containing compound to form an amorphous silica coating on the surface of said fibers, and
   b. heating said coated fibers to a temperature and for a period of time to form a zircon phase on said fibers by the reaction of said silica with said zirconia.

2. The process of claim 1 wherein said zirconia fibers are unstabilized.

3. The process of claim 2 wherein said coated zirconia fibers are heated to a temperature of from about 2000° to about 2500°F.

4. The process of claim 1 wherein said zirconia fibers are fully stabilized in the cubic or tetragonal form.

5. The process of claim 4 wherein said coated zirconia fibers are heated to a temperature of from about 2300° to about 2500°F.

6. The process of claim 1 wherein said zircon-coated fibers contain from about 20 to about 50 weight percent zircon.

7. The process of claim 1 wherein said zirconia fibers are coated with from about 5 to about 35 weight percent amorphous silica.

8. Structures containing zircon-coated zirconia fibers prepared by the process of claim 1.

* * * * *